United States Patent
Conquest

(10) Patent No.: US 9,354,308 B1
(45) Date of Patent: May 31, 2016

(54) MICRO CLIMATE CORRECTIONS FOR RADAR INTERFEROMETRY MEASUREMENTS

(71) Applicant: Trimble Navigation Limited, Sunnyvale, CA (US)

(72) Inventor: Curt Conquest, Longmont, CO (US)

(73) Assignee: Trimble Navigation Limited, Sunnyvale, CA (US)

(*) Notice: Subject to any disclaimer, the term of this patent is extended or adjusted under 35 U.S.C. 154(b) by 26 days.

(21) Appl. No.: 14/561,804

(22) Filed: Dec. 5, 2014

(51) Int. Cl.
*G01S 13/90* (2006.01)

(52) U.S. Cl.
CPC .................. *G01S 13/9023* (2013.01)

(58) Field of Classification Search
CPC ..... G01S 13/9023; G01S 13/88; G01S 13/89; G01S 7/414; G01S 19/07; G01S 2007/4091
USPC .................. 342/25 C, 26 D, 28, 59, 114–115
See application file for complete search history.

(56) References Cited

U.S. PATENT DOCUMENTS

| | | | | |
|---|---|---|---|---|
| 6,727,849 B1 * | 4/2004 | Kirk | ........................ | G01C 15/00 342/357.52 |
| 6,850,183 B2 * | 2/2005 | Reeves | ................... | G01C 11/00 342/175 |
| 7,768,442 B2 * | 8/2010 | Stickley | .................. | G01S 7/414 342/114 |
| 7,898,461 B2 * | 3/2011 | Stickley | .................. | G01S 7/414 342/114 |
| 9,086,488 B2 * | 7/2015 | Tchoryk, Jr. | ............ | G01S 17/95 |
| 2004/0046690 A1 * | 3/2004 | Reeves | ................... | G01C 11/00 342/175 |
| 2009/0121921 A1 * | 5/2009 | Stickley | .................. | G01S 7/414 342/179 |
| 2010/0045513 A1 * | 2/2010 | Pett | ......................... | G01S 7/295 342/25 C |
| 2010/0289693 A1 * | 11/2010 | Stickley | .................. | G01S 7/414 342/176 |

(Continued)

FOREIGN PATENT DOCUMENTS

AU    WO 2007009175 A1 *  1/2007  ............. G01S 7/414
WO         2007/009175 A1    1/2007

OTHER PUBLICATIONS

Kumar, V.; Venkataraman, G.; Rao, Y.S.; Singh, G.; Snehmani, "Spaceborne InSAR Technique for Study of Himalayan Glaciers using ENVISAT ASAR and ERS Data," in Geoscience and Remote Sensing Symposium, 2008. IGARSS 2008. IEEE International , vol. 4, No., pp. IV-1085-IV-1088, Jul. 7-11, 2008.*

(Continued)

*Primary Examiner* — John B Sotomayor
(74) *Attorney, Agent, or Firm* — Kilpatrick Townsend & Stockton LLP

(57) ABSTRACT

A method for monitoring movement of a surface using ground based radar interferometry measurements includes identifying micro climates on the surface and determining boundaries of the micro climates on the surface. One or more first sensors are arranged at a measurement site for measuring first atmospheric conditions at the measurement site. One or more additional sensors are arranged in each of the micro climates for measuring atmospheric conditions in the micro climates. An atmospheric correction is determined for each of the micro climates. The atmospheric correction for each micro climate is based on the first atmospheric conditions at the measurement site and the atmospheric conditions at the micro climate. The ground based radar interferometry measurements are performed across the surface, and the ground based radar interferometry measurements within the boundary of each micro climate are corrected using the atmospheric correction for the micro climate.

20 Claims, 3 Drawing Sheets

(56) References Cited

U.S. PATENT DOCUMENTS

2013/0314694 A1* 11/2013 Tchoryk, Jr. ............ G01S 17/95 356/28.5
2016/0047940 A1* 2/2016 Owen .................... G01V 11/00 702/2

OTHER PUBLICATIONS

Takahashi, K.; Mecatti, D.; Dei, D.; Matsumoto, M.; Sato, M., "Landslide observation by ground-based SAR interferometry," in Geoscience and Remote Sensing Symposium (IGARSS), 2012 IEEE International , vol., No., pp. 6887-6890, Jul. 22-27, 2012.*

Antonello, G.; Fortuny, J.; Tarchi, D.; Casagli, N.; Del Ventisette, C.; Guerri, L.; Luzi, G.; Mugnai, F.; Leva, D., "Microwave interferometric sensors as a tool for space and time analysis of active volcano deformations: The Stromboli case," in Use of Remote Sensing Techniques for Monitoring Volcanoes and Seismogenic Areas, 2008. USEReST 2008. Sec.*

Caduff, R.; Kos, A.; Schlunegger, F.; McArdell, B.W.; Wiesmann, A., "Terrestrial Radar Interferometric Measurement of Hillslope Deformation and Atmospheric Disturbances in the Illgraben Debris-Flow Catchment, Switzerland," in Geoscience and Remote Sensing Letters, IEEE , vol. 11, No. 2, pp. 434-438, Feb. 2014.*

Hartwig, M. E. et al., "Detection and Monitoring of Surface Motions in Active Open Pit Iron Mine in the Amazon Region, Using Persistent Scatterer Interferometry with TerraSAR-X Satellite Data," *Remote Sensing*, published Sep. 18, 2013, Issue 5, pp. 4719-4734.

Mora, O. et al., "Slope Stability monitoring in Open Pit and Underground mine by means of Radar Interferometry," *Proceedings of the Slope Stability Conference*, Brisbane (Australia), Sep. 2013, pp. 1-15.

\* cited by examiner

MICRO CLIMATE CORRECTIONS FOR RADAR INTERFEROMETRY MEASUREMENTS

FIELD OF THE INVENTION

Embodiments described herein relate generally to radar interferometry, and more particularly, to monitoring movement of surfaces using radar interferometry measurements.

BACKGROUND

Known ground based radar interferometry measurements can be used to monitor movement of surfaces and have the potential of sub-millimeter accuracy. These measurements typically involve obtaining radar images at different times and using shifts in reflected radiation to determine movement. Some applications for these measurements include identifying slope failure in open pit mines and monitoring movement of volcanoes or glaciers.

As used herein, ground based radar interferometry measurements include a number of slightly different radar interferometry techniques. The different techniques use the same basic process of performing radar scans across a surface, detecting radiation reflected from the surface, and comparing the phase or amplitude of reflected waves between the different scans. Depending on the specific technique, the radar images may be obtained from the same or different locations. Examples of known radar interferometry techniques include synthetic aperture radar (SAR) interferometry, differential SAR interferometry (DInSAR), and slope stability radar (SSR). Many other radar interferometry techniques exist and can be used with the methods described herein.

One source of error in radar interferometry measurements is the delay of radar waves propagating through air. In a vacuum, the waves travel at the speed of light, but in the air, the waves travel at a speed less than the speed of light. The speed in air is dependent on atmospheric conditions (e.g., temperature, pressure, humidity). The speed in air is also dependent on the frequency of the waves. Changes in the atmospheric conditions between radar scans and along a transmission path can change the speed of the waves and thus introduce error into the measurements.

Improved methods are constantly desired for reducing error (and improving accuracy) of radar interferometry measurements.

SUMMARY

Embodiments described herein provide improved methods for monitoring movement of surfaces using ground based radar interferometry measurements. In an embodiment, for example, measurement error is reduced (and accuracy is increased) by identifying micro climates across a surface and correcting the ground based radar interferometry measurements based on the atmospheric conditions within the micro climates.

In an embodiment, a method for monitoring movement of a surface using ground based radar interferometry measurements includes identifying the micro climates on the surface and determining boundaries of the micro climates on the surface. Each of the micro climates may extend across a portion of the surface. One or more first sensors are arranged at a measurement site for measuring first atmospheric conditions at the measurement site. The measurement site is a location from which the ground based radar interferometry measurements are performed. One or more additional sensors are arranged in each of the micro climates for measuring atmospheric conditions in each of the micro climates. An atmospheric correction is determined for each of the micro climates based on the first atmospheric conditions at the measurement site and the atmospheric conditions at the micro climate. The ground based radar interferometry measurements are performed across the surface, and the ground based radar interferometry measurements within the boundary of each micro climate are corrected using the atmospheric correction for the micro climate.

Numerous benefits are achieved using embodiments described herein over conventional techniques. For example, some embodiments identify micro climates across a surface and determine the atmospheric conditions within each micro climate. Using the atmospheric conditions, an atmospheric correction can be determined for each micro climate that allows the speed of radar waves reflected from surfaces within the micro climate to be estimated more accurately. Also, atmospheric corrections may be determined for each radar scan. This can reduce the error (and improve accuracy) in radar interferometry measurements. Depending on the embodiment, one or more of these benefits may exist. These and other benefits are described throughout the specification.

DETAILED DESCRIPTION

Embodiments described herein provide methods for monitoring movement of a surface using ground based radar interferometry measurements. In an embodiment, for example, micro climates are identified across a measurement surface and atmospheric conditions are determined within each micro climate. Using the atmospheric conditions, atmospheric corrections are determined for each micro climate, and the atmospheric corrections are used to correct radar interferometry measurements. Using the atmospheric corrections, improved measurement accuracy and reliability can be obtained.

Figure 1A:
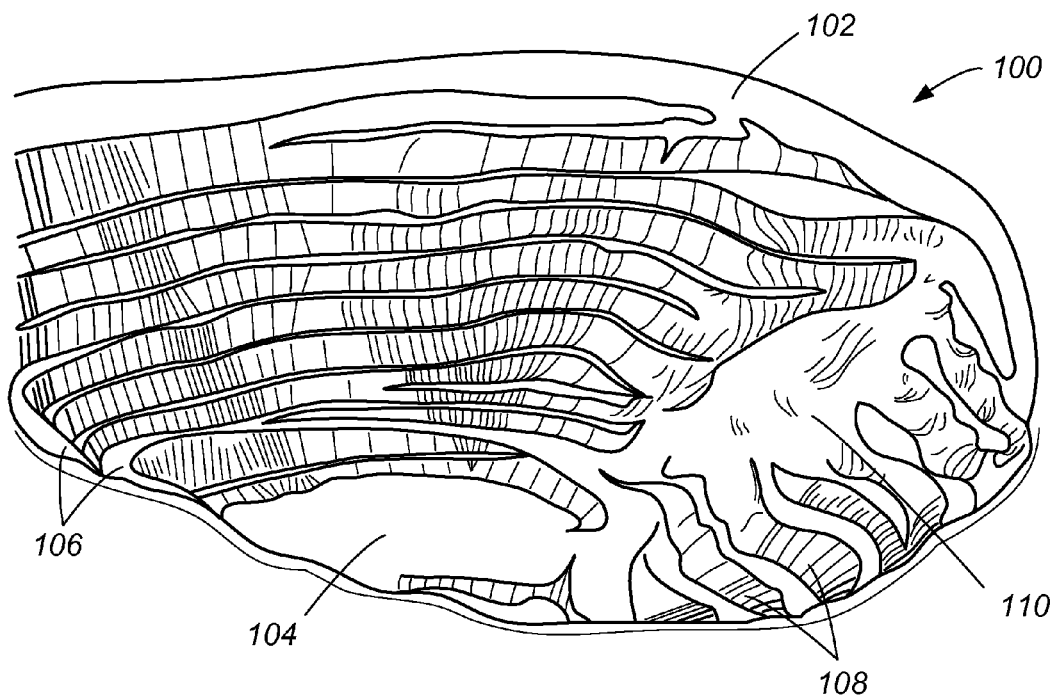
FIG. 1a is a simplified perspective view of an open pit mine that is used to describe implementations of some embodiments.
Figure 1B:
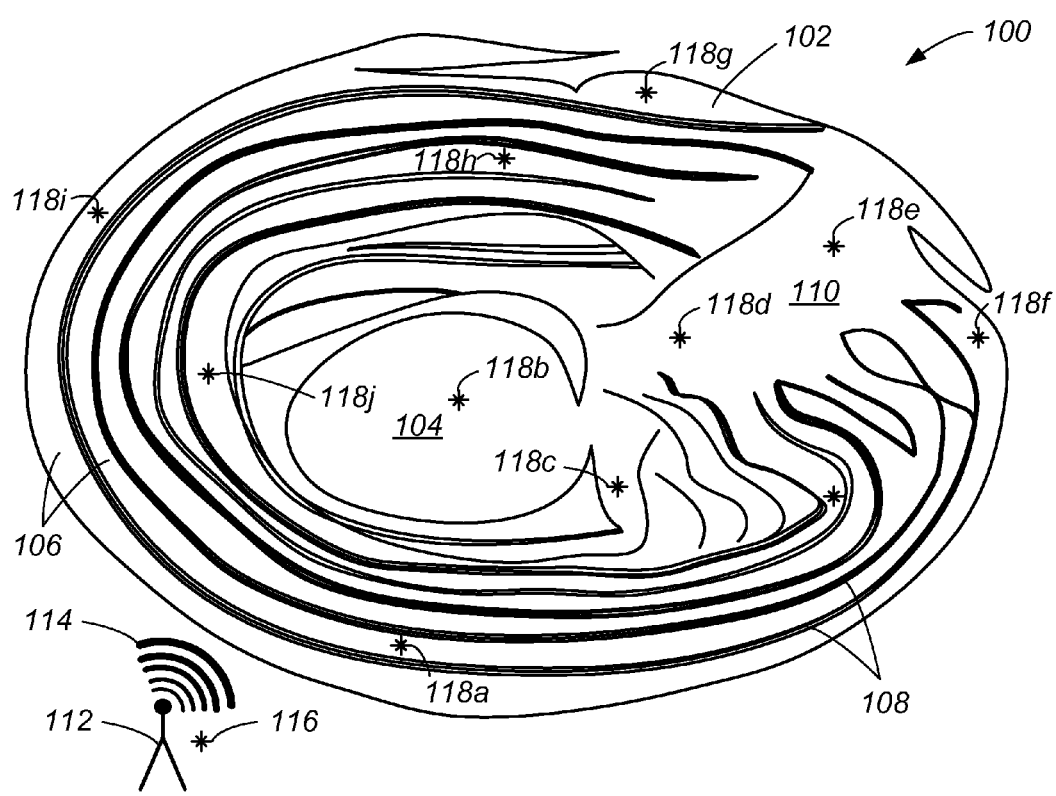
FIG. 1b is a simplified top view of the open pit mine illustrated in FIG. 1 and that is also used to describe implementations of some embodiments.

FIGS. 1a-1b are simplified views of an open pit mine 100 that is used to describe implementations of some embodiments. The open pit mine 100 is used merely as an example of a surface that can be monitored using ground based radar interferometry measurements. The methods described herein are not limited to open pit mines and can be used with ground based radar interferometry measurements of any surface. As examples, in addition to monitoring ground subsidence in open pit mines, radar interferometry measurements are commonly used to monitor ground movement caused by earthquakes or volcanoes, we well as movement of glaciers and changes in glacial structures.

The open pit mine 100 shown in FIG. 1a includes a upper edge 102 surrounding a top part of the pit, a bottom 104 extending along a lower part of the pit, a number of benches 106 extending substantially horizontally along sides of the pit, and inclined walls 108 extending somewhat vertically between the benches 106. This figure provides a perspective view of the open pit mine 100, so far sides of the pit are visible and near sides are obscured. The open pit mine 100 shown in this figure also includes a landslide area 110 where sides of the pit have collapsed due to structural weakness.

Ground based radar interferometry measurements can be used to monitor movement of surfaces in the open pit mine 100 and identify areas of likely slope failure. Radar scans can be performed regularly to provide a near real-time monitor. One source of error in ground based radar interferometry measurements is the delay of radar waves propagating through the air. The speed of the radar waves depends on the refractive index of the air, and the refractive index is dependent on atmospheric conditions (e.g., temperature, pressure, and/or humidity). Changes in the atmospheric conditions between radar scans and along a transmission path can change the speed of the waves and thus introduce error in the form of an apparent movement of the surfaces.

As can be appreciated with reference to the open pit mine 100 shown in FIG. 1*a*, the structure of an open pit mine can create diverse atmospheric conditions. For example, the depth of an open pit mine from the upper edge 102 to the bottom 104 may be thousands of feet. This depth alone can create significant differences in the atmospheric conditions between upper and lower portions of the pit. The relatively enclosed bottom 104 compared to the relatively open upper edge 102 can magnify these differences. Even across similar elevations, differences in atmospheric conditions can exist due to different surface compositions and different exposures to sunlight or outside weather conditions and patterns. The different exposures can be caused by general conditions (e.g., facing a particular direction such as North or South) or by more local conditions (e.g., shading or shielding provided by sharp countours in the surfaces). Many other conditions can contribute to the diverse atmospheric conditions including the distance from one edge to another (which can be thousands of feet across) and nearby features.

These diverse atmospheric conditions are referred to generally as micro climates. With regard to surfaces, a micro climate may cover an area that has relatively uniform atmospheric conditions under normal circumstances. Different micro climates across a surface can be identified by measuring atmospheric conditions at a number of locations across the surface or, alternatively, they can be identified based on differences across the surface that are most likely to result in different micro climates, such as differences in structure, composition, location, exposure, and the like. Embodiments described herein provide atmospheric corrections for each micro climate across the surface. The atmospheric corrections can be used to improve radar interferometry measurement accuracy and reliability.

FIG. 1*b* is a top view of the open pit mine 100 shown in FIG. 1*a* and shows a ground based radar interferometry system 112 near a part of the upper edge 102. The ground based radar interferometry system 112 includes one or more antennas for transmitting and receiving radiation 114 during radar interferometry measurements. The ground based radar interferometry system 112 may scan just a portion of the open pit mine 100 or it may scan all visible surfaces. The ground based radar interferometry system 112 may be set up near the upper edge 102 at a location that provides good visibility of the surfaces that are to be monitored. The area around the ground based radar interferometry system 112 may be referred to generally as the measurement site.

In this example, a sensor 116 is arranged at or near the measurement site. The sensor 116 is for measuring atmospheric conditions (e.g., temperature, pressure, and/or humidity) at the measurement site.

This example also includes a number of additional sensors 118*a*-118*j* arranged at various locations across a surface of the open pit mine 100. At least one of the additional sensors 118*a*-118*j* is located within each of the identified micro climates. For example, a sensor 118*b* is located at the bottom 104 of the pit; sensors 118*d* and 118*e* are located at different elevations along the landslide area 110; sensors 118*c*, 118*h*, and 118*j* are located along side surfaces pit; and additional sensors 118*a*, 118*f*, 118*g*, and 118*i* are located along different parts of the upper edge 102. In this example, each of these additional sensors 118*a*-118*j* is located within a different micro climate. The additional sensors 118*a*-118*j* are for measuring atmospheric conditions (e.g., temperature, pressure, and/or humidity) within each of the micro climates.

Each of the additional sensors 116 and 118*a*-118*j* may include a MetPac (meteorological pack) or a similar sensor (or sensors) for measuring atmospheric conditions. Each of the additional sensors 116 and 118*a*-118*j* may be coupled (e.g., wired or wirelessly) to the ground based radar interferometry system 112 using known techniques so that measured conditions can be sent from the additional sensors 116 and 118*a*-118*j* to the ground based radar interferometry system 112.

Depending on the particular surface being monitored and the measurement accuracy desired, a different number of micro climates may be identified (more or less) and a corresponding different number of the additional sensors may be used.

An atmospheric correction may be determined for each of the micro climates. The atmospheric correction may be used to correct radar interferometry measurements based on the atmospheric conditions along a transmission path between a radar interferometry antenna and a measured point on the surface. This assumes that the atmospheric conditions along the transmission path can be determined based on measured conditions at the measurement site (using additional sensor 116) and/or measured conditions within a given micro climate (using one of additional sensors 118*a*-118*j*). The atmospheric correction can be determined based on an average of the atmospheric conditions at the measurement site and at the particular micro climate, based on a weighted average of the atmospheric conditions at the measurement site and at the particular micro climate, or any other function that takes into account the atmospheric conditions at the measurement site and at the particular micro climate. For example, the atmospheric conditions at the measurement site may be weighted more heavily if they are more likely to be representative of conditions along the transmission path. Alternatively, the atmospheric conditions at the particular micro climate may be weighted more heavily if the conditions close to the surface are most likely to vary. In some embodiments, the atmospheric conditions at the measurement site and the atmospheric conditions at the particular micro climate may be weighted equally. The particular weighting scheme used may depend on other variables such as the time of day of the scan or the macro weather conditions during the scan.

Embodiments described herein can improve measurement accuracy and reliability because they account for varying conditions across the surface as well as varying conditions between the measurement location and the surface.

Figure 2:
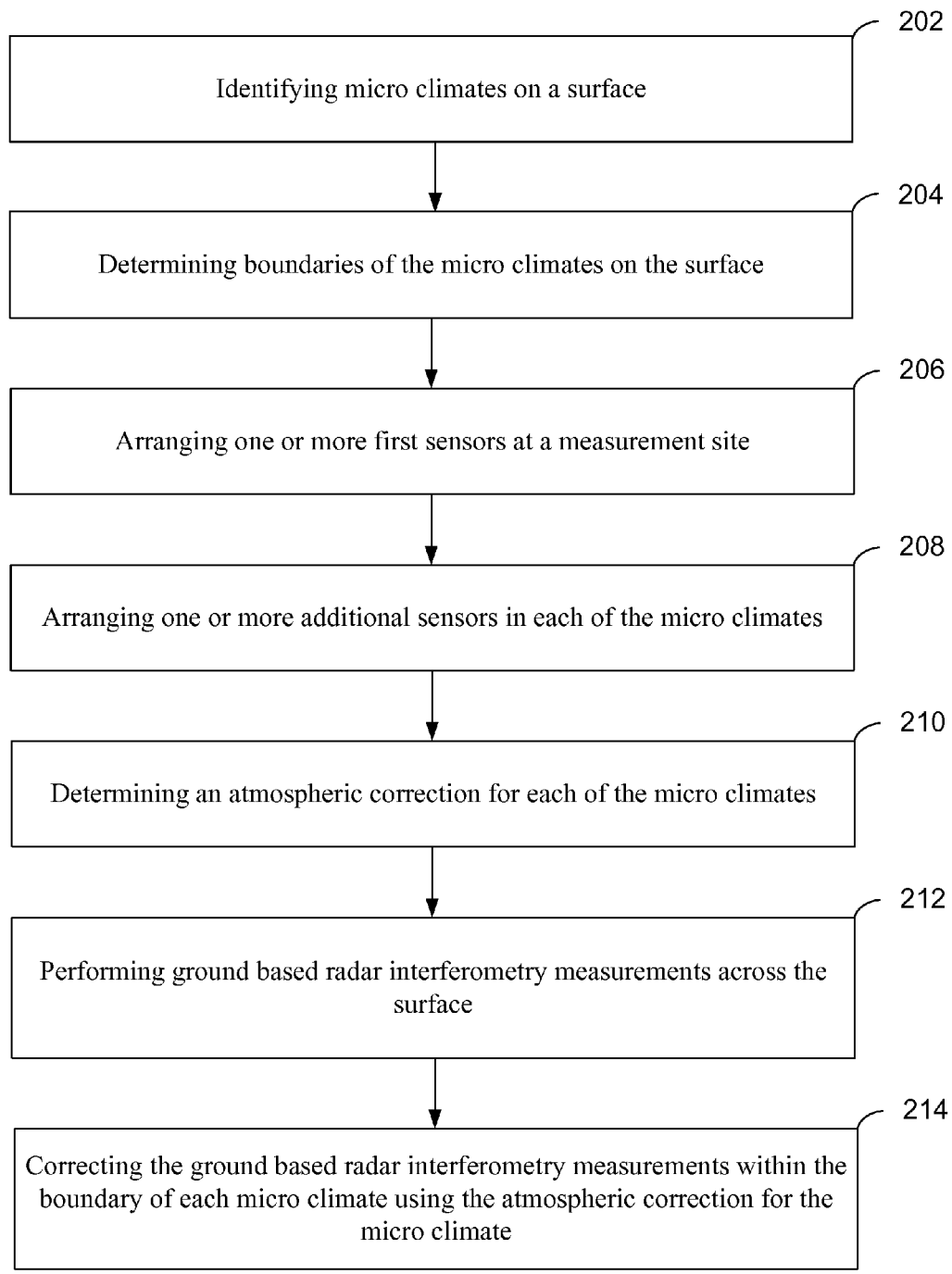
FIG. 2 is a flowchart providing a method for monitoring movement of a surface using ground based radar interferometry measurements in accordance some embodiments.

FIG. 2 is a flowchart providing a method for monitoring movement of a surface using ground based radar interferometry measurements in accordance some embodiments. The method provides the greatest benefit when the surface extends over an area that includes a number of micro climates. The method includes identifying the micro climates on the surface (202). Some embodiments may not include this step since the micro climates may have been identified previously or by another party. The different micro climates may be identified in a number of ways including by measuring atmospheric conditions across the surface, or based on any of a number of differences across the surface including differences in structure, composition, location, exposure, and the like. The different micro climates may also be identified based on at least one of distance from the measurement site, a local composition of the surface, different exposures of the surface to sunlight, different contours across the surface, or different elevations compared to the measurement site.

The method also includes determining boundaries of the micro climates on the surface (204). In some embodiments, the step of identifying the micro climates may also include determining the boundaries of the micro climates. Each micro climate may extend across only a portion of the surface. The boundaries of the micro climates may be determined in a manner similar to that of identifying the micro climates (e.g., by measuring atmospheric conditions across the surface, based on differences across the surface, and the like). In some embodiments, the boundaries of each micro climate may abut the boundaries of an adjacent micro climate so that all portions of the surface are within a boundary of one of the micro climates. In other embodiments, some portions of the surface may be outside the boundaries of the micro climates. For portions of the surface outside the boundaries, the atmospheric correction may be based only on atmospheric conditions at a measurement site.

The method also includes arranging one or more first sensors at the measurement site (206). The one or more first sensors are for measuring first atmospheric conditions at the measurement site. The method also includes arranging one or more additional sensors in each of the micro climates (208). The one or more additional sensors are for measuring atmospheric conditions in each of the micro climates. The atmospheric conditions may be communicated, for example, from the one or more first sensors and from the one or more additional sensors to a ground based radar interferometry system.

The method also includes determining an atmospheric correction for each of the micro climates (210). The atmospheric correction for each micro climate may be based on the first atmospheric conditions at the measurement site and the atmospheric conditions at the micro climate. In some embodiments, the atmospheric correction for each of the micro climates may be determined based on an average of the first atmospheric conditions at the measurement site and the atmospheric conditions at the micro climate. In other embodiments, the atmospheric correction for each of the micro climates may be determined based on a weighted average of the first atmospheric conditions at the measurement site and the atmospheric conditions at the micro climate.

The method also includes performing a ground based radar interferometry measurements across the surface (212). The ground based radar interferometry measurements may be performed using any of a number of different radar interferometry techniques. These techniques typically utilize differential measurements involving multiple radar scans. Data from each of the radar scans may be corrected using the atmospheric correction. Alternatively, an atmospheric correction may be determined for each of the radar scans. In some embodiments, the atmospheric correction for each of the micro climates may be determined concurrently with performing the ground based radar interferometry measurements. For example, the one or more first sensors and each of the additional sensors may both measure atmospheric conditions at scheduled times or as prompted by another device such as the ground based radar interferometry system.

The method also includes correcting the ground based radar interferometry measurements within the boundary of each micro climate using the atmospheric correction for the micro climate (214). The atmospheric correction provides an estimate of the transmission delay of radar waves used for the ground based radar interferometry measurements.

It should be appreciated that the specific steps illustrated in FIG. 2 provide particular methods according to some embodiments. Other sequences of steps may also be performed according to alternative embodiments. For example, alternative embodiments may perform the steps outlined above in a different order. Moreover, the individual steps illustrated in FIG. 2 may include multiple sub-steps that may be performed in various sequences. Furthermore, additional steps may be added or removed depending on the particular application.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for monitoring movement of a surface using ground based radar interferometry measurements, where the surface extends over an area that includes micro climates, the method comprising:
    identifying the micro climates on the surface;
    determining boundaries of the micro climates on the surface, each of the micro climates extending across a portion of the surface;
    arranging one or more first sensors at a measurement site, the one or more first sensors for measuring first atmospheric conditions at the measurement site, the measurement site being a location from which the ground based radar interferometry measurements are performed;
    arranging one or more additional sensors in each of the micro climates, the one or more additional sensors for measuring atmospheric conditions in each of the micro climates;
    determining an atmospheric correction for each of the micro climates, the atmospheric correction for each micro climate based on the first atmospheric conditions at the measurement site and the atmospheric conditions at the micro climate;
    performing the ground based radar interferometry measurements across the surface; and correcting the ground based radar interferometry measurements within the boundary of each micro climate using the atmospheric correction for the micro climate.

2. The method of claim 1 wherein the micro climates are identified based on at least one of a distance from the measurement site, a local composition of the surface, different exposures of the surface to sunlight, different contours across the surface, or different elevations from the measurement site.

3. The method of claim 1 wherein the boundaries of each micro climate abut the boundaries of an adjacent micro climate and all portions of the surface are within a boundary of one of the micro climates.

4. The method of claim 1 wherein some portions of the surface are outside the boundaries of the micro climates.

5. The method of claim 1 wherein the atmospheric correction for each of the micro climates is determined based on an average of the first atmospheric conditions at the measurement site and the atmospheric conditions at the micro climate.

6. The method of claim 1 wherein the atmospheric correction for each of the micro climates is determined based on a weighted average of the first atmospheric conditions at the measurement site and the atmospheric conditions at the micro climate.

7. The method of claim 1 wherein the one or more first sensors are for measuring at least one of temperature, pressure, or humidity.

8. The method of claim 1 wherein the one or more additional sensors are for measuring at least one of temperature, pressure, or humidity.

9. The method of claim 1 wherein the ground based radar interferometry measurements are differential measurements involving multiple radar scans, and data from each of the radar scans is corrected using the atmospheric correction.

10. The method of claim 1 wherein the ground based radar interferometry measurements are differential measurements involving multiple radar scans, and an atmospheric correction is determined for each of the radar scans.

11. The method of claim 1 wherein the atmospheric correction for each of the micro climates is determined concurrently with performing the ground based radar interferometry measurements.

12. The method of claim 1 wherein the atmospheric correction is for estimating a transmission delay of radar waves used for the ground based radar interferometry measurements.

13. A method for monitoring movement of a surface using ground based radar interferometry measurements, the method comprising:
   determining boundaries of micro climates on the surface, each of the micro climates extending across a portion of the surface;
   arranging one or more first sensors near a measurement site, the one or more first sensors for measuring first atmospheric conditions at the measurement site, the measurement site being a location from which the ground based radar interferometry measurements are performed;
   arranging one or more additional sensors in each of the micro climates, the one or more additional sensors for measuring atmospheric conditions in each of the micro climates;
   determining an atmospheric correction for each of the micro climates, the atmospheric correction for each micro climate based on a weighted average of the first atmospheric conditions at the measurement site and the atmospheric conditions at the micro climate;
   performing the ground based radar interferometry measurements across the surface; and
   correcting the ground based radar interferometry measurements within the boundary of each micro climate using the atmospheric correction for the micro climate.

14. The method of claim 13 wherein boundaries of the micro climates are determined based on at least one of a distance from the measurement site, a local composition of the surface, different exposures of the surface to sunlight, different contours across the surface, or different elevations compared to the measurement site.

15. The method of claim 13 wherein the one or more first sensors are located at the measurement site.

16. The method of claim 13 wherein the atmospheric correction for each of the micro climates is determined concurrently with performing the ground based radar interferometry measurements.

17. The method of claim 13 wherein the first atmospheric conditions at the measurement site and the atmospheric conditions at the micro climate are weighted equally for determining the atmospheric correction for at least a portion of the micro climates.

18. A method for monitoring movement of a surface using ground based radar interferometry measurements, the method comprising:
   identifying micro climates on the surface;
   arranging one or more first sensors near a measurement site, the one or more first sensors for measuring first atmospheric conditions at the measurement site, the measurement site being a location from which the ground based radar interferometry measurements are performed;
   arranging one or more additional sensors in each of the micro climates, the one or more additional sensors for measuring atmospheric conditions in each of the micro climates;
   determining an atmospheric correction for each of the micro climates, the atmospheric correction for each micro climate based on the first atmospheric conditions at the measurement site and the atmospheric conditions at the micro climate;
   performing the ground based radar interferometry measurements across the surface; and
   correcting the ground based radar interferometry measurements around each micro climate using the atmospheric correction for the micro climate.

19. The method of claim 18 wherein the one or more first sensors are located at the measurement site.

20. The method of claim 18 wherein the atmospheric correction for each micro climate is determined based on a weighted average of the first atmospheric conditions at the measurement site and the atmospheric conditions at the micro climate.

* * * * *